(12) United States Patent
Yonehana

(10) Patent No.: US 10,081,260 B2
(45) Date of Patent: Sep. 25, 2018

(54) SUPPLEMENTAL CHARGING CONTROL DEVICE FOR ELECTRIC VEHICLE

(71) Applicant: HONDA MOTOR CO., LTD., Minato-Ku, Tokyo (JP)

(72) Inventor: Atsushi Yonehana, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 15/453,475

(22) Filed: Mar. 8, 2017

(65) Prior Publication Data

US 2017/0259674 A1   Sep. 14, 2017

(30) Foreign Application Priority Data

Mar. 10, 2016  (JP) ................... 2016-046965

(51) Int. Cl.
 B60L 11/18  (2006.01)
 B60L 1/00  (2006.01)
 B60L 11/00  (2006.01)
(52) U.S. Cl.
 CPC ............. B60L 11/1814 (2013.01); B60L 1/00 (2013.01)
(58) Field of Classification Search
 CPC ...... B60L 11/1814; B60L 1/00; B60L 11/887; G05B 15/02

USPC ................... 701/22, 99; 180/65.29
See application file for complete search history.

(56) References Cited

U.S. PATENT DOCUMENTS

| 9,356,445 B2 * | 5/2016 | Ge ...................... B60L 11/1887 |
| 2010/0244782 A1 | 9/2010 | Nagayama et al. |
| 2012/0299377 A1 | 11/2012 | Masuda et al. |

FOREIGN PATENT DOCUMENTS

| JP | 2010-206885 A | 9/2010 |
| JP | 2011-062018 A | 3/2011 |
| JP | 5293841 B2 | 9/2013 |

* cited by examiner

*Primary Examiner* — Gertrude Arthur Jeanglaude
(74) *Attorney, Agent, or Firm* — Carrier Blackman & Associates, P.C.; Joseph P. Carrier; William D. Blackman

(57) ABSTRACT

After system stop of an electric vehicle, a vehicle control ECU of a supplemental charging control device refers to a table, which indicates a relationship between an auxiliary equipment battery voltage, a supplemental charging start time, and a voltage reduction prospective value, determines the voltage reduction prospective value, calculates a correction coefficient using the determined voltage reduction prospective value, etc., and then adjusts the next supplemental charging start time based on the calculated correction coefficient.

3 Claims, 5 Drawing Sheets

SUPPLEMENTAL CHARGING CONTROL DEVICE FOR ELECTRIC VEHICLE

CROSS-REFERENCE TO RELATED APPLICATION

This application is based upon and claims the benefit of priority from Japanese Patent Application No. 2016-046965 filed on Mar. 10, 2016, the contents of which are incorporated herein by reference.

BACKGROUND OF THE INVENTION

Field of the Invention

The present invention relates to a supplemental charging control device for an electric vehicle, which carries out supplemental charging of a battery for auxiliary equipment.

Description of the Related Art

In general, an electric vehicle includes a high-voltage drive battery that supplies electrical power to a drive source, and a low-voltage battery for auxiliary equipment or auxiliary devices, which supplies electrical power to the auxiliary devices and to an ECU (Engine Control Unit). When the ECU is activated by supply of electrical power to the ECU from the auxiliary equipment battery, under the control of the ECU, supply of electrical power to the drive source from the drive battery commences, and the electric vehicle is started.

Incidentally, if the auxiliary equipment battery goes dead, supply of electrical power to the ECU cannot be carried out. Consequently, the ECU is not activated, and supply of electrical power from the drive battery to the drive source is not carried out, so that the electric vehicle cannot be started up.

In order to avoid the battery going dead in this manner, in Japanese Patent No. 5293841, a technique is disclosed for intermittently monitoring the voltage of an auxiliary equipment battery during suspension of traveling, with the object of preventing problems in starting the vehicle due to a voltage reduction of the auxiliary equipment battery during suspension of traveling, and in the case that the voltage falls below a predetermined voltage, supplemental charging to the auxiliary equipment battery is carried out. Further, in Japanese Laid-Open Patent Publication No. 2011-062018, a technique is disclosed in which supplemental charging of an auxiliary equipment battery is implemented when a voltage value of the auxiliary equipment battery falls below a predetermined value. Furthermore, in Japanese Laid-Open Patent Publication No. 2010-206885, a technique is disclosed for intermittently monitoring the voltage of an auxiliary equipment battery during suspension of traveling, in order to prevent a situation where the vehicle cannot travel due to a voltage reduction of the auxiliary equipment battery during suspension of traveling, and in the case that the voltage falls below a predetermined voltage, supplemental charging to the auxiliary equipment battery is carried out.

SUMMARY OF THE INVENTION

However, according to the techniques of Japanese Patent No. 5293841 and Japanese Laid-Open Patent Publication No. 2010-206885, while driving is stopped, it is necessary to obtain voltage values of the auxiliary equipment battery by being activated a number of times intermittently, as well as to judge the condition of such voltage values. Consequently, the power consumption of the auxiliary equipment battery is increased. As a result, since it is necessary to charge the auxiliary equipment battery from the drive battery, the power consumption of the drive battery also increases, thereby affecting the electrical power economy of the electric vehicle. Further, with the technical concept disclosed in Japanese Laid-Open Patent Publication No. 2011-062018, since the voltage detecting unit is always activated, power consumption of the auxiliary equipment battery is further increased, and thus electrical power economy of the electric vehicle cannot be improved.

The present invention has been devised taking into consideration such problems, and has the object of providing a supplemental charging control device for an electric vehicle, which is capable of suppressing the occurrence of the auxiliary equipment battery going dead, while also improving electrical power economy.

The present invention relates to a supplemental charging control device for an electric vehicle, which is equipped with a drive battery configured to supply electrical power to a drive source of the electric vehicle, and an auxiliary equipment battery configured to supply electrical power to auxiliary equipment of the electric vehicle, the supplemental charging control device carrying out supplemental charging to the auxiliary equipment battery from the drive battery.

In this case, the supplemental charging control device is equipped with a supplemental charging start time setting unit, a correction coefficient calculating unit, a supplemental charging unit, and a supplemental charging start time adjusting unit.

The supplemental charging start time setting unit sets a supplemental charging start time with respect to the auxiliary equipment battery, based on a voltage value of the auxiliary equipment battery, after a system stop of the electric vehicle.

The correction coefficient calculating unit determines a voltage reduction prospective value indicative of how much the voltage value of the auxiliary equipment battery will be reduced by the system stop, on the basis of the voltage value of the auxiliary equipment battery, and calculates a correction coefficient for correcting a next supplemental charging start time, using the determined voltage reduction prospective value, a voltage value of the auxiliary equipment battery at the end of a previous supplemental charging mode, and the voltage value of the auxiliary equipment battery at the start of a current supplemental charging mode.

The supplemental charging unit carries out supplemental charging from the drive battery to the auxiliary equipment battery for a predetermined time upon elapse of the supplemental charging start time.

The supplemental charging start time adjusting unit adjusts the next supplemental charging start time using the correction coefficient, when the next supplemental charging start time is set by the supplemental charging start time setting unit.

According to the present invention, after system stop, the voltage reduction prospective value indicative of how much the voltage value of the auxiliary equipment battery will be reduced is determined, the correction coefficient is calculated using the voltage reduction prospective value, etc., and the next supplemental charging start time is adjusted based on the calculated correction coefficient. In this manner, according to the present invention, the start time of the next supplemental charging is adjusted depending on the degree of reduction in the voltage value of the auxiliary equipment battery or how much the voltage value of the auxiliary equipment battery is decreased.

Therefore, compared to a configuration in which activation of the system simply takes place intermittently during suspension of traveling, as disclosed in Japanese Patent No. 5293841 and Japanese Laid-Open Patent Publication No. 2010-206885, or a configuration in which the voltage detecting unit is activated at all times, as disclosed in Japanese Laid-Open Patent Publication No. 2011-062018, it is possible to reduce the number of times that the supplemental charging control device is activated. Consequently, inadvertent power consumption of the auxiliary equipment battery can be reduced.

In addition, it is possible to suppress the occurrence of the auxiliary equipment battery going dead, in a state in which the electric vehicle has not been used for a prolonged time period while the system stop is continued. Furthermore, since there is no need to adopt a large capacity battery for the auxiliary equipment battery in preparation for a case in which the electric vehicle has not been used for a prolonged time period, the auxiliary equipment battery can be made smaller in scale, and the weight of the electric vehicle can be reduced.

In this manner, according to the present invention, since the start time of the next supplemental charging is adjusted corresponding to the degree of reduction in the voltage value of the auxiliary equipment battery or how much the voltage value of the auxiliary equipment battery is decreased, it is possible to avoid carrying out supplemental charging from the drive battery to the auxiliary equipment battery any more than necessary, as well as to improve the electrical power economy of the electric vehicle.

In this instance, the correction coefficient calculating unit preferably determines a first voltage difference between the voltage value of the auxiliary equipment battery at the end of the previous supplemental charging mode, and the voltage value of the auxiliary equipment battery at the start of the current supplemental charging mode, further determines a second voltage difference between the determined first voltage difference and the voltage reduction prospective value, and on the basis of the determined second voltage difference, preferably updates the correction coefficient by adjusting a current correction coefficient.

By repeatedly updating the correction coefficient, it is possible to maintain a state of high capacity of the auxiliary equipment battery. Consequently, since the capacity of the auxiliary equipment battery can be set without coming under the influence of dark current (standby current), it is possible to further miniaturize the auxiliary equipment battery and reduce the weight of the auxiliary equipment battery.

Further, in the case that a decrease in the voltage value of the auxiliary equipment battery due to the system stop is greater than the voltage reduction prospective value, the correction coefficient calculating unit preferably updates the correction coefficient to a value that is less than the current correction coefficient, whereas, in the case that the decrease is less than the voltage reduction prospective value, the correction coefficient calculating unit preferably updates the correction coefficient to a value that is greater than the current correction coefficient.

Since the size of the correction coefficient is adjusted corresponding to the decrease in the voltage value of the auxiliary equipment battery due to system stop, by multiplying the next supplemental charging start time by the correction coefficient, the supplemental charging start time adjusting unit is capable of adjusting the next supplemental charging start time.

For example, if the amount of decrease is large, the next supplemental charging is started earlier. In accordance with this feature, in the case that the voltage value of the auxiliary equipment battery is low, the capacity of the auxiliary equipment battery can be quickly recovered. Further, in the case that the auxiliary equipment battery becomes deteriorated, or if batteries of different capacities are mounted in the electric vehicle, the auxiliary equipment battery can gradually be brought into an optimal state while the correction coefficient is sequentially updated.

On the other hand, if the amount of decrease is small, starting of the next supplemental charging is delayed. Consequently, the number of times that the supplemental charging control device is activated can be minimized, power consumption of the auxiliary equipment battery can be suppressed, and the electrical power economy of the electric vehicle can be further improved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment concerning a supplemental charging control device for an electric vehicle according to the present invention will be exemplified and described in detail below with reference to the accompanying drawings.

Configuration of the Present Embodiment

Figure 1:
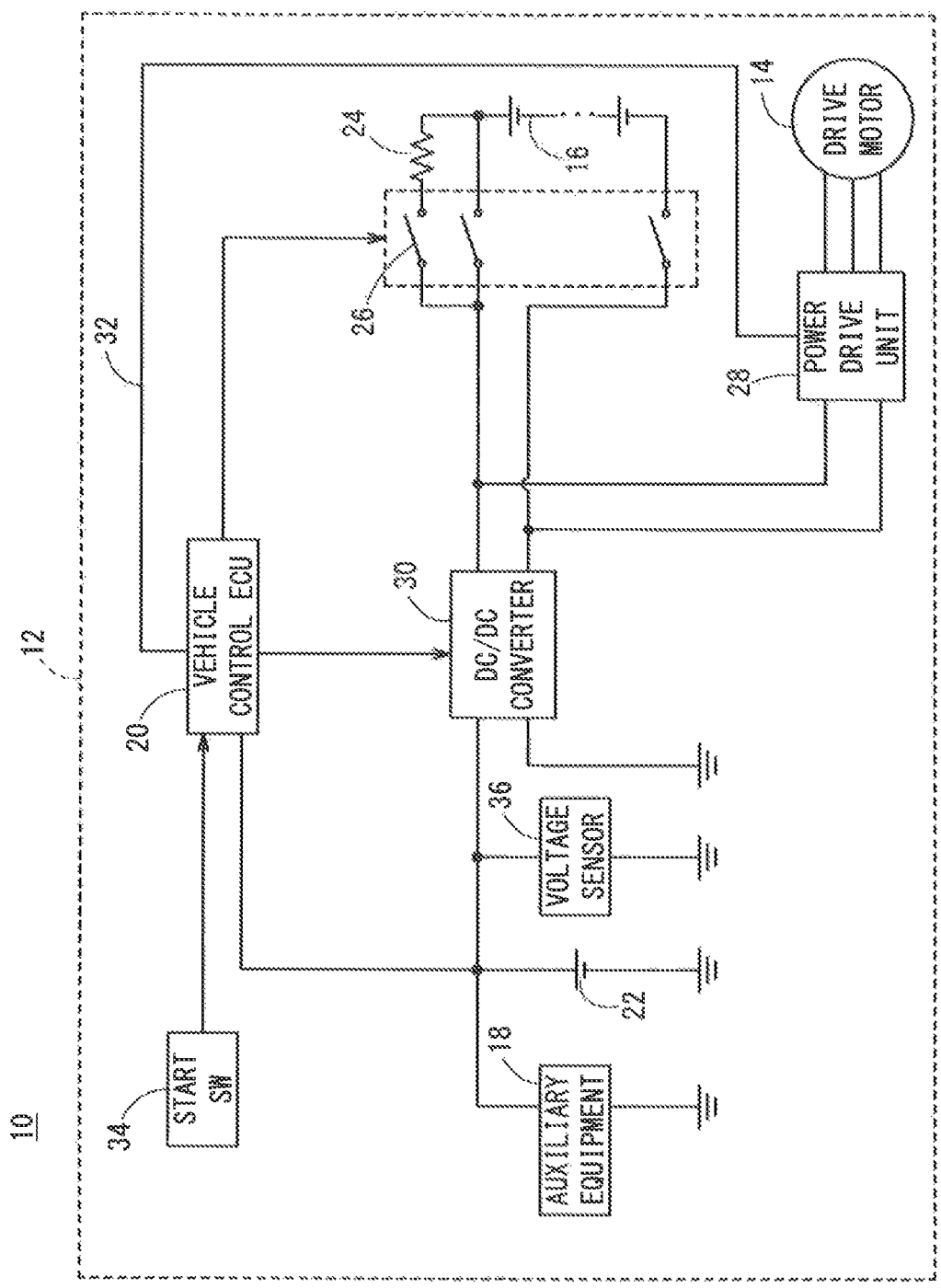
FIG. 1 is a circuit configuration diagram of an electric vehicle including a supplemental charging control device according to a present embodiment.

As shown in FIG. 1, a supplemental charging control device 10 for an electric vehicle according to the present embodiment (hereinafter also referred to as a supplemental charging control device 10 according to the present embodiment) is applied to an electric vehicle 12.

The electric vehicle 12 includes a drive motor 14 (drive source), a drive battery 16, which is a high voltage (for example, 120 V to 200 V) battery that supplies electrical power to the drive motor 14, and a low voltage (for example, 12 V) auxiliary equipment battery 22 that supplies electrical power to auxiliary equipment (auxiliary devices) 18 and a vehicle control ECU 20 (a supplemental charging start time setting unit, a correction coefficient calculating unit, a supplemental charging unit, and a supplemental charging start time adjusting unit).

A resistor 24 is connected to a positive electrode of the drive battery 16, and a series circuit made up from the drive battery 16 and the resistor 24 is connected through a plurality of contactors 26 to a power drive unit 28 and a DC/DC converter 30. The power drive unit 28 is connected through a CAN communications line 32 to the vehicle control ECU 20. Further, the DC/DC converter 30 is connected to the auxiliary equipment battery 22, together with being connected to the drive battery 16 and the power drive unit 28.

Furthermore, a positive terminal of the auxiliary equipment battery 22 is connected to the vehicle control ECU 20. One terminal of the DC/DC converter 30 on the auxiliary equipment battery 22 side, a negative terminal of the auxiliary equipment battery 22, and one terminal of the auxiliary equipment 18 are grounded to the body or the like of the electric vehicle 12.

The vehicle control ECU 20 is connected to a start switch 34. Further, the vehicle control ECU 20 is activated by receiving supply of power from the auxiliary equipment battery 22. A voltage sensor 36 is connected in parallel with the auxiliary equipment battery 22. The voltage sensor 36 detects a voltage value of the auxiliary equipment battery 22, or a voltage value (auxiliary equipment battery voltage) V of the DC/DC converter 30 on the side of the auxiliary equipment battery 22, and outputs the detection result thereof to the vehicle control ECU 20.

The vehicle control ECU 20 is a computational device containing a microcomputer, which includes a CPU (Central Processing Unit) and a memory, etc. The vehicle control ECU 20 is capable of executing the functions described below by reading out and executing programs that are stored in the memory as a non-transitory storage medium. Further, according to the present embodiment, the vehicle control ECU 20 may be equipped with a non-illustrated power supply voltage detecting circuit, and such a power supply voltage detecting circuit is capable of detecting the auxiliary equipment battery voltage V. In the following description, a case in which the voltage sensor 36 detects the auxiliary equipment battery voltage V will be described.

Following activation thereof, the vehicle control ECU 20, by turning on the contactors 26, causes electrical power to be supplied through the contactors 26 from the drive battery 16 to the power drive unit 28 and the DC/DC converter 30.

Further, the vehicle control ECU 20 controls the power drive unit 28 through the CAN communications line 32. Consequently, the power drive unit 28 converts the electrical power (DC power) supplied from the drive battery 16 into a three-phase AC power, and supplies the converted three-phase AC power to the drive motor 14. As a result, the drive motor 14 is driven, whereby the electric vehicle 12 can be started.

On the other hand, at a time of electrical power regeneration, the drive motor 14 functions as an electrical generator, and converts kinetic energy into three-phase AC power. In accordance with this feature, by converting the three-phase AC power into DC power, the power drive unit 28 charges the drive battery 16, or supplies the DC power to the DC/DC converter 30.

Furthermore, by controlling switching of non-illustrated switching elements that make up the DC/DC converter 30 at a predetermined duty ratio, the vehicle control ECU 20 carries out voltage conversion by the DC/DC converter 30 between the side of the auxiliary equipment battery 22 and the side of the drive battery 16 and the power drive unit 28. Consequently, electrical power from the drive battery 16, or electrical power from the power drive unit 28 during power regeneration is supplied to the auxiliary equipment battery 22 through the DC/DC converter 30, whereby the auxiliary equipment battery 22 can be charged with the electrical power.

The DC/DC converter 30 may be constituted by a general DC/DC converter. Therefore, concerning the detailed configuration of the DC/DC converter 30, description thereof is omitted.

Further, the supplemental charging control device 10 according to the present embodiment serves as a device for carrying out supplemental charging to the auxiliary equipment battery 22 from the drive battery 16 in order to avoid the occurrence of the auxiliary equipment battery 22 going dead, and is configured to include electrical power supplying pathways that provide connections between the vehicle control ECU 20, the contactors 26 and the DC/DC converter 30, and between the drive battery 16 and the auxiliary equipment battery 22.

Operations of the Present Embodiment

Figure 2:
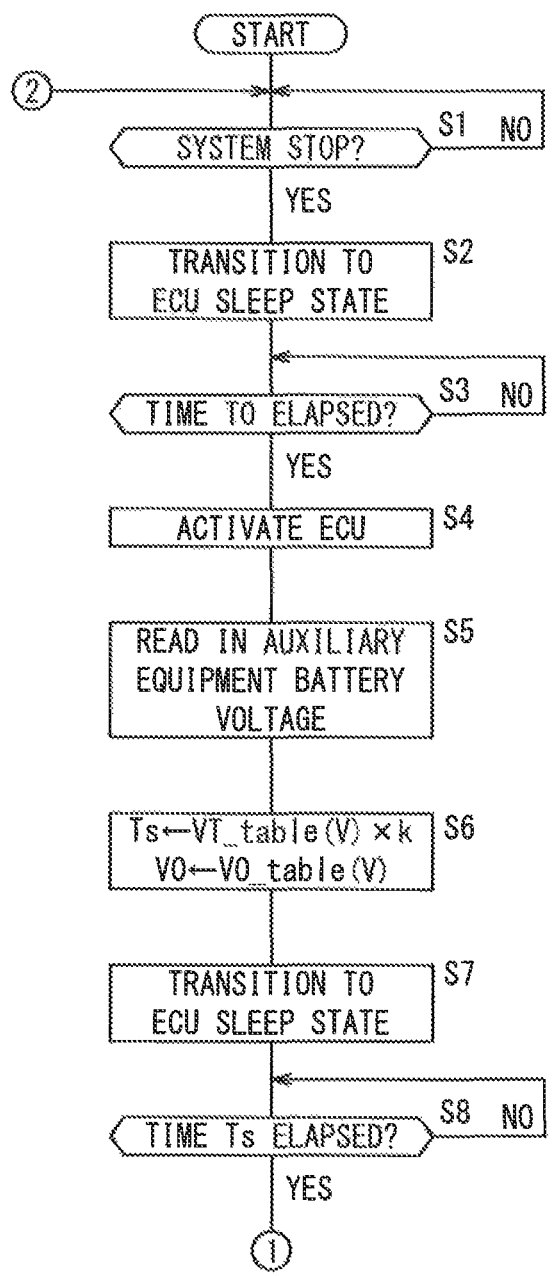
FIG. 2 is a flowchart for describing the supplemental charging control of the present embodiment.
Figure 3:
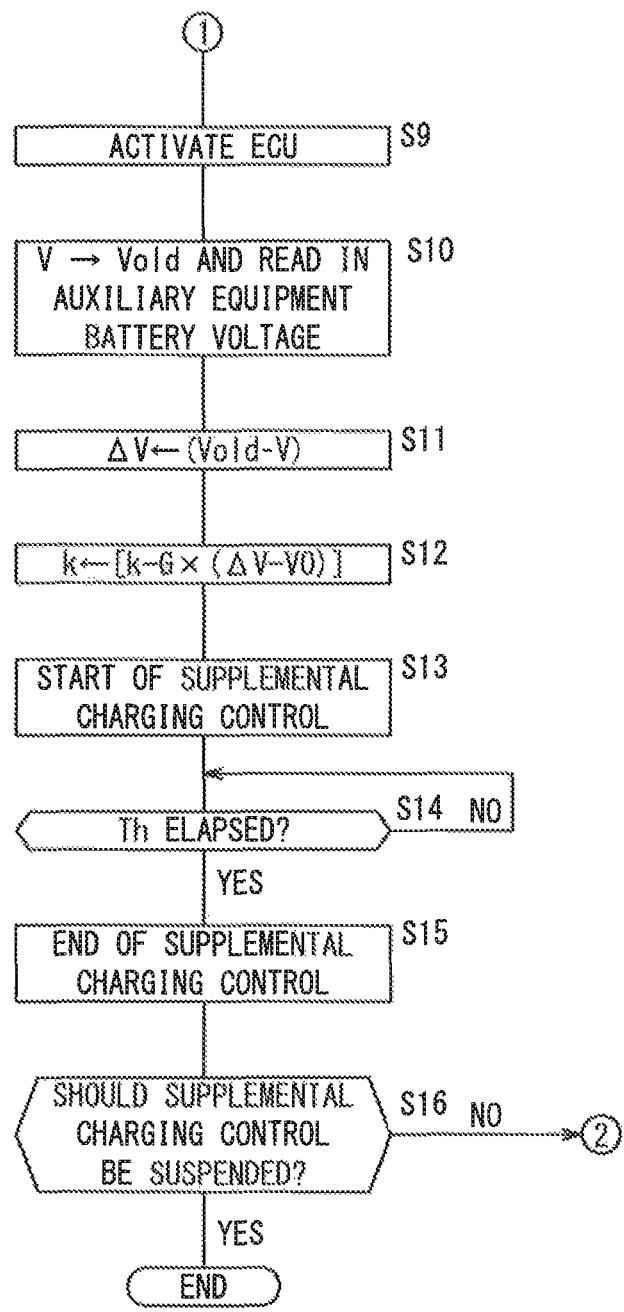
FIG. 3 is a flowchart for describing the supplemental charging control of the present embodiment.

Operations of the supplemental charging control device 10 according to the present embodiment, which is configured in the manner described above, will be described with reference to FIGS. 2 through 5. In this instance, a case will be described in which, after a system of the electric vehicle 12 has been stopped (i.e., after a system stop of the electric vehicle 12), the vehicle control ECU 20 is activated, and by the vehicle control ECU 20 controlling the contactors 26 and the DC/DC converter 30, supplemental charging to the auxiliary equipment battery 22 is carried out from the drive battery 16 through the contactors 26 and the DC/DC converter 30. For this reason, it is noted that the processes of the flowcharts of FIGS. 2 and 3 are performed primarily by the vehicle control ECU 20. Further, in the description of operations, as necessary, descriptions may also be made with reference to FIG. 1.

Figure 4:
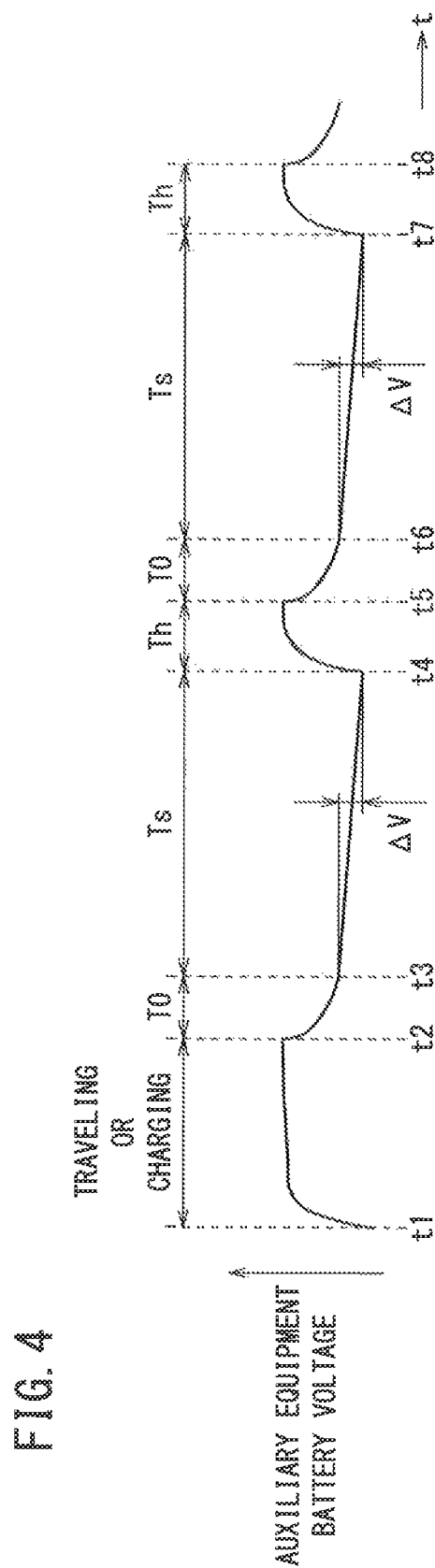
FIG. 4 is a timing chart for describing the supplemental charging control of the present embodiment.

FIG. 4 is a timing chart in which system stop of the electric vehicle 12 and the supplemental charging control by the supplemental charging control device 10 are illustrated.

At time t1 in FIG. 4, traveling of the electric vehicle 12 is started, or charging with respect to the auxiliary equipment battery 22 is initiated.

In the case that the electric vehicle 12 is to undergo traveling, when the driver presses the start switch 34, an activation signal is supplied from the start switch 34 to the vehicle control ECU 20. Since the auxiliary equipment battery 22 carries out supply of electrical power to the vehicle control ECU 20, the vehicle control ECU 20 is activated by supply of the activation signal from the start switch 34, and by receiving the supplied power from the auxiliary equipment battery 22.

The activated vehicle control ECU 20 places the contactors 26 in an ON state. Consequently, through the contactors 26, the drive battery 16 is capable of supplying electrical power to the power drive unit 28 and the DC/DC converter 30.

Further, the vehicle control ECU 20 controls the power drive unit 28 through the CAN communications line 32. Consequently, the power drive unit 28 converts the electrical power supplied from the drive battery 16 into a three-phase AC power, and following conversion thereof, supplies the three-phase AC power to the drive motor 14. As a result, the drive motor 14 is driven, and the electric vehicle 12 can be made to travel.

Furthermore, the vehicle control ECU 20 supplies a control signal to the DC/DC converter 30, and initiates a voltage conversion operation by the DC/DC converter 30. Consequently, the DC voltage supplied to the DC/DC converter 30 from the drive battery 16 is subjected to voltage conversion, and the converted DC voltage is supplied to the auxiliary equipment battery 22, thereby charging the auxiliary equipment battery 22.

On the other hand, in the case of charging the auxiliary equipment battery 22, the vehicle control ECU 20, which is activated by receiving supply of electrical power from the auxiliary equipment battery 22, places the contactors 26 in an ON state. Consequently, through the contactors 26, the drive battery 16 supplies electrical power to the DC/DC converter 30. In addition, the vehicle control ECU 20 supplies a control signal to the DC/DC converter 30, and initiates the voltage conversion operation by the DC/DC converter 30. Consequently, the DC voltage supplied to the DC/DC converter 30 from the drive battery 16 is subjected to voltage conversion, and the converted DC voltage is supplied to the auxiliary equipment battery 22, thereby charging the auxiliary equipment battery 22.

Thus, in step S1 of FIG. 2, the vehicle control ECU 20 determines whether or not system stop of the electric vehicle 12 has taken place. More specifically, it is determined whether or not traveling of the electric vehicle 12 has ended by the driver turning off a non-illustrated ignition switch, whether or not the auxiliary equipment battery 22 has been fully charged, or whether or not supplemental charging of the auxiliary equipment battery 22 has been completed. Moreover, in the case that the voltage value (auxiliary equipment battery voltage) V of the auxiliary equipment battery 22 detected by the voltage sensor 36 is greater than or equal to a predetermined threshold value, the vehicle control ECU 20 may determine that full charging or supplemental charging has been completed.

If the judgment result in step S1 is affirmative (step S1: YES), then the vehicle control ECU 20 determines that system stop of the electric vehicle 12 has been carried out. At time t2 of the timing chart of FIG. 4, traveling of the electric vehicle 12 is stopped, or charging of the auxiliary equipment battery 22 is completed. Accordingly, in the time period from time t1 to time t2, the determination process of step S1 is executed repeatedly at predetermined time intervals until it is determined that system stop has occurred.

In step S2, the vehicle control ECU 20 transitions into a sleep state. Transitioning to the sleep state is carried out immediately after it is determined (at time t2) that system stop in step S1 has occurred. As a result, discharging of the auxiliary equipment battery 22 commences, and as shown in FIG. 4, the auxiliary equipment battery voltage V decreases with time from time t2.

In step S3, the vehicle control ECU 20 determines whether or not a predetermined time period T0 has elapsed from transitioning (at time t2) into the sleep state. The auxiliary equipment battery voltage V decreases rapidly with the elapse of time immediately after time t2, and thereafter, the auxiliary equipment battery voltage V decreases steadily (moderately) with time. The time period T0 is a preset time period indicative of a time until the auxiliary equipment battery voltage begins to decrease steadily. In addition, in the process of step S3, for example, by a non-illustrated timer which is incorporated in the vehicle control ECU 20, measurement of time may be started from time t2, and it may be determined that the time period T0 has elapsed if the timer measures time t3 at which the time period T0 has elapsed from time t2.

At time t3, if the time period T0 has elapsed from time t2 (step S3: YES), the vehicle control ECU 20 is activated again (step S4), and the auxiliary equipment battery voltage V is read in from the voltage sensor 36 (step S5). The auxiliary equipment battery voltage V that is read in, for example, is stored in a non-illustrated memory inside the vehicle control ECU 20.

In the following step S6, with reference to the table shown in FIG. 5, the vehicle control ECU 20 sets the start time for the next supplemental charging (a supplemental charging start time) Ts to take place from the drive battery 16 to the auxiliary equipment battery 22, together with setting a voltage reduction prospective value V0 indicating how much the auxiliary equipment battery voltage V will be lowered due to the system stop.

Figure 5:
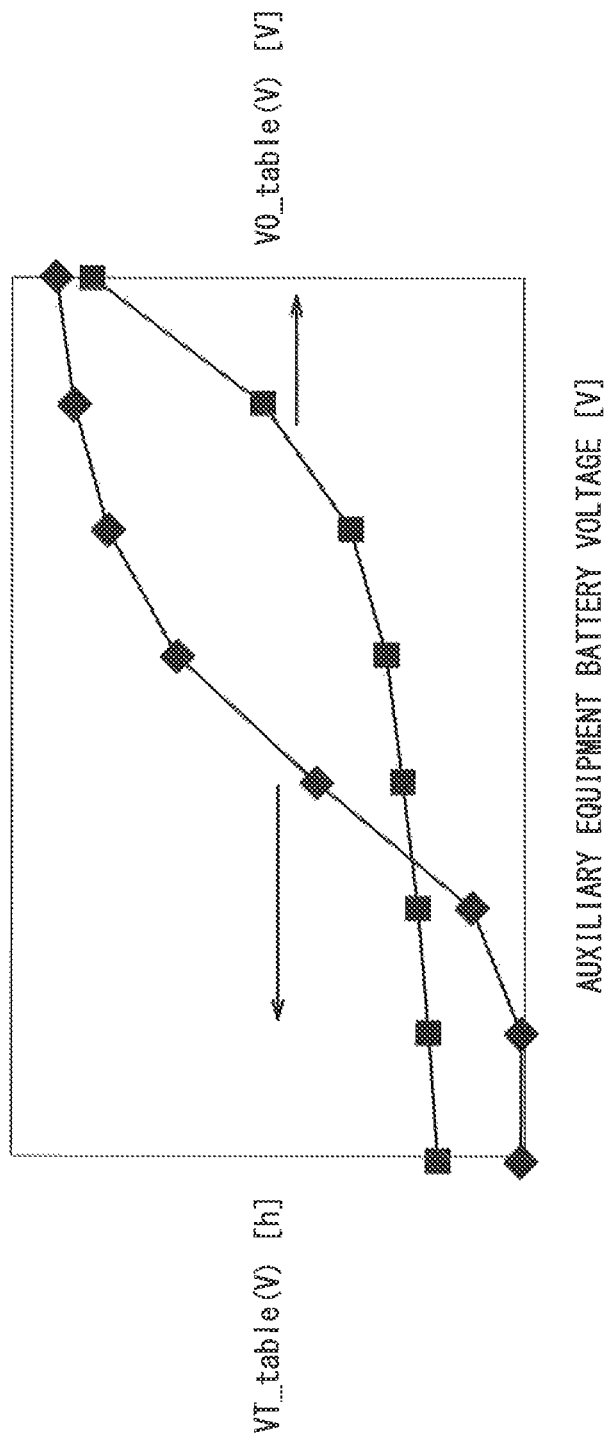
FIG. 5 is a table for setting a supplemental charging start time and a voltage reduction prospective value.

The table of FIG. 5 is provided in the vehicle control ECU 20. In the table, the horizontal axis indicates the auxiliary equipment battery voltage V, whereas the two vertical axes indicate a supplemental charging start time $VT\_table(V)$ corresponding to the auxiliary equipment battery voltage V, and a voltage reduction prospective value $V0\_table(V)$ corresponding to the auxiliary equipment battery voltage V. Consequently, in the table, respective curves are plotted, which are indicative of a relationship between the auxiliary equipment battery voltage V and the supplemental charging start time $VT\_table(V)$, as well as a relationship between the auxiliary equipment battery voltage V and the voltage reduction prospective value $V0\_table(V)$.

Thus, in step S6, the vehicle control ECU 20 first obtains the supplemental charging start time $VT\_table(V)$ and the voltage reduction prospective value $V0\_table(V)$ corresponding to the auxiliary equipment battery voltage V detected by the voltage sensor 36.

Next, the vehicle control ECU 20 multiplies the supplemental charging start time $VT\_table(V)$ by a correction coefficient k, and as shown in the following formula (1), sets the multiplied value, $VT\_table(V) \times k$, as a determined value for the next supplemental charging start time Ts.

$$Ts \leftarrow VT\_table(V) \times k \qquad (1)$$

The correction coefficient k is a coefficient for correcting the next supplemental charging start time Ts, and is set, at time t3 of FIG. 4, to an arbitrary value by the process of step S6. More specifically, since time t3 is the first time that the supplemental charging control (supplemental charging mode) is carried out, at this time, the updating process for the correction coefficient k, which will be described later, is not performed. Therefore, at the first time that the process of step S6 is performed, the supplemental charging start time $VT\_table(V)$ is multiplied by the arbitrarily set value of the correction coefficient k in order to obtain the next supplemental charging start time Ts.

Further, as will be discussed later, according to the present embodiment, since it is necessary to adjust the supplemental charging start time Ts in accordance with the degree of reduction in the auxiliary equipment battery voltage V due to discharging of the auxiliary equipment battery 22, the vehicle control ECU 20 adjusts the supplemental charging start time $VT\_table(V)$ corresponding to the auxiliary equipment battery voltage V, to the next supplemental charging start time Ts as indicated by the above-described formula (1).

Further, as shown in the following formula (2), the vehicle control ECU 20 sets the voltage reduction prospective value $V0\_table(V)$ as a determined value for the voltage reduction prospective value V0.

$$V0 \leftarrow V0\_table(V) \qquad (2)$$

As shown in FIG. 5, the supplemental charging start time $VT\_table(V)$ becomes longer as the auxiliary equipment battery voltage V is larger, whereas the supplemental charging start time VT_table(V) becomes shorter as the auxiliary equipment battery voltage V is smaller. More specifically, in the process of step S6, the supplemental charging start time Ts is set longer as the auxiliary equipment battery voltage V corresponding to the capacity of the auxiliary equipment battery 22 becomes larger, and starting of the next supplemental charging with respect to the auxiliary equipment battery 22 is delayed. On the other hand, the supplemental charging start time Ts is set shorter as the auxiliary equipment battery voltage V corresponding to the capacity of the auxiliary equipment battery 22 becomes smaller, and the next supplemental charging with respect to the auxiliary equipment battery 22 is started earlier. In this manner, the supplemental charging control device 10 is capable of adjusting the supplemental charging start time Ts depending on the magnitude of the auxiliary equipment battery voltage V.

After completion of the process of step S6 (at time t3), the vehicle control ECU 20 transitions again into the sleep state (step S7). Accordingly, during the operations of the present embodiment, the supplemental charging control (of the first time that the processes of steps S1 to S7 are performed) from time t1 to time t3 is referred to as a first time supplemental charging mode.

In step S8, the vehicle control ECU 20 determines whether or not the supplemental charging start time Ts which was set in step S6 has elapsed from transitioning (at time t3) into the sleep state. In this case, the vehicle control ECU 20 may determine that the supplemental charging start time Ts has elapsed when measurement of time according to the timer is started from time t3, and time t4, at which the supplemental charging start time Ts has elapsed from time t3, is measured.

At time t4, in the case it is determined that the supplemental charging start time Ts has elapsed from time t3 (step S8: YES), then in step S9 of FIG. 3, the vehicle control ECU 20 is reactivated. More specifically, a second time supplemental charging mode is started from time t4.

In the following step S10, the vehicle control ECU 20 sets the auxiliary equipment battery voltage V, which was stored in the memory at time t3, to the previous auxiliary equipment battery voltage (previously read voltage) Vold, as shown in the following formula (3). The previous auxiliary equipment battery voltage Vold is defined by the auxiliary equipment battery voltage V at the time that the previous supplemental charging mode (for example, the first time supplemental charging mode) has been completed.

$$V \rightarrow Vold \quad (3)$$

Further, the vehicle control ECU 20 reads the most recent auxiliary equipment battery voltage V from the voltage sensor 36. Accordingly, the most recent auxiliary equipment battery voltage V is defined by the auxiliary equipment battery voltage V at the time that the present supplemental charging mode (for example, the second time supplemental charging mode) is started.

Additionally, in step S11, the vehicle control ECU 20 determines a voltage difference (first voltage difference) ΔV between the previously read voltage Vold and the most recent auxiliary equipment battery voltage V at time t4, as shown in the following formula (4).

$$\Delta V \leftarrow (Vold - V) \quad (4)$$

In the following step S12, at first, the vehicle control ECU 20 determines a voltage difference (second voltage difference) (ΔV−V0) between the first voltage difference ΔV and the voltage reduction prospective value V0. Next, the vehicle control ECU 20 multiplies the second voltage difference (ΔV−V0) by a predetermined gain G. The gain G is a fixed value. Next, the vehicle control ECU 20 obtains a difference between the currently set correction coefficient k and the aforementioned multiplied value G×(ΔV−V0), and updates the obtained difference (k−G×(ΔV−V0)) as a new correction coefficient k. More specifically, in step S12, a computation process based on the following formula (5) is performed.

$$k \leftarrow [k - G \times (\Delta V - V0)] \quad (5)$$

In this case, as the first voltage difference ΔV corresponding to the discharge amount of the auxiliary equipment battery 22 during the sleep state of the vehicle control ECU 20 becomes larger than the voltage reduction prospective value V0, i.e., as the second voltage difference (ΔV−V0) becomes larger, there is a greater possibility that the auxiliary equipment battery 22 is discharging more than expected. Consequently, according to formula (5), the vehicle control ECU 20 updates the correction coefficient k to a smaller value, thereby causing the next supplemental charging start time Ts to be shorter, as will be described later.

On the other hand, as the first voltage difference ΔV becomes smaller than the voltage reduction prospective value V0, i.e., as the second voltage difference (ΔV−V0) becomes smaller, it can be determined that the auxiliary equipment battery 22 is not discharging very much. In this case, according to formula (5), the vehicle control ECU 20 updates the correction coefficient k to a larger value, thereby causing the next supplemental charging start time Ts to be longer.

Consequently, by updating the value of the correction coefficient k depending on the size of the second voltage difference (ΔV−V0), the supplemental charging control device 10 is capable of adjusting the next supplemental charging start time Ts.

In step S13, after these processes have been completed, the supplemental charging control of the auxiliary equipment battery 22 is started from time t4. More specifically, the vehicle control ECU 20 turns on the contactors 26, together with supplying a control signal to the DC/DC converter 30 and starting the voltage conversion operation, whereby supplemental charging of the auxiliary equipment battery 22 is initiated from the drive battery 16 through the contactors 26 and the DC/DC converter 30. Consequently, after time t4, the auxiliary equipment battery voltage V rises with time.

In step S14, the vehicle control ECU 20 determines whether or not a supplemental charging execution time Th, which was set beforehand, has elapsed from time t4. In this case, the vehicle control ECU 20 may determine that the supplemental charging execution time Th has elapsed when measurement of time according to the timer is started from time t4, and time t5, at which the supplemental charging execution time Th has elapsed from time t4, is measured.

At time t5, if the supplemental charging execution time Th is determined to have elapsed from time t4 (step S14: YES), then in step S15, the vehicle control ECU 20 suspends supplemental charging to the auxiliary equipment battery 22. More specifically, the vehicle control ECU 20 turns off the contactors 26 and supplies a control signal for turning off the switching elements, to the DC/DC converter 30, thereby stopping the voltage conversion operation.

In the following step S16, the vehicle control ECU 20 determines whether or not execution of the supplemental charging control with respect to the auxiliary equipment battery 22 should be stopped. If execution of the supplemental charging control is necessary even after time t5 (step S16: NO), the routine returns to the process of step S1 of FIG. 2, and after time t5, the processes of step S1 and thereafter are carried out.

More specifically, the processes performed in the period of time from time t5 to time t6 are the same as the processes (steps S1 to S3) performed in the period of time from time t2 to time t3. Further, the processes performed at time t6 are the same as the processes (steps S4 to S7) performed at time t3. Furthermore, the processes performed in the period of time from time t6 to time t7 are the same as the processes (steps S8 to S13) performed in the period of time from time t3 to time t4. Further still, the processes performed in the period of time from time t7 to time t8 are the same as the processes (steps S14, S15) performed in the period of time from time t4 to time t5.

Stated otherwise, in the case that the processes of the supplemental charging control are to be executed continuously, the processes of steps S1 to S15 are repeated. Moreover, the second time supplemental charging mode is executed in the period of time from time t4 to time t6.

However, among the processes of the repeatedly executed steps S1 through S15, in the process of step S6, using the correction coefficient k that was determined in the previous execution of step S12, the vehicle control ECU 20 obtains the next supplemental charging start time Ts from the above formula (1). Further, in the process of step S12, concerning the correction coefficient k that was determined in the previous execution of step S12, the vehicle control ECU 20 updates the concerned correction coefficient k in accordance with the above formula (5). Consequently, each time that the supplemental charging control (supplemental charging mode) is repeatedly executed, the next supplemental charging start time Ts, etc. are set, and the correction coefficient k is updated.

A description will now be given concerning a case in which supplemental charging with respect to the auxiliary equipment battery 22 is brought to an end upon elapse of the supplemental charging execution time Th. According to the present embodiment, during execution of supplemental charging with respect to the auxiliary equipment battery 22, supplemental charging may be terminated in any of the following cases: (1) if the ignition switch is placed in an ON state, (2) if the auxiliary equipment battery 22 is charged from a charging gun by connecting the charging gun to the electric vehicle 12, (3) if a door lock of the electric vehicle 12 is unlocked, (4) if a door of the electric vehicle 12 is opened, (5) if the electric vehicle 12 has recognized a non-illustrated smart key, or (6) if the electric vehicle 12 is placed in an accessory mode (ACC mode).

Further, according to the present embodiment, it is possible to prohibit supplemental charging of the auxiliary equipment battery 22 in the case that the vehicle control ECU 20 detects a system failure of the electric vehicle 12, or if the capacity of the drive battery 16 is low.

Effects of the Present Embodiment

As described above, in accordance with the supplemental charging control device 10 according to the present embodiment, after a system stop of the electric vehicle 12 (step S1: YES), the voltage reduction prospective value V0 indicative of how much the voltage value (auxiliary equipment battery voltage V) of the auxiliary equipment battery 22 will be reduced is determined (step S6), the correction coefficient k is calculated using the determined voltage reduction prospective value V0, etc. (step S12), and the next supplemental charging start time Ts is adjusted on the basis of the calculated correction coefficient k (step S6). In this manner, according to the present embodiment, the supplemental charging start time Ts is adjusted depending on the degree of reduction in the auxiliary equipment battery voltage V.

Therefore, compared to a configuration in which the system is simply activated intermittently during suspension of traveling, as disclosed in Japanese Patent No. 5293841 and Japanese Laid-Open Patent Publication No. 2010-206885, or a configuration in which the voltage detecting unit is activated at all times, as disclosed in Japanese Laid-Open Patent Publication No. 2011-062018, it is possible to reduce the number of times that the supplemental charging control device 10 is activated. Consequently, inadvertent power consumption of the auxiliary equipment battery 22 can be reduced.

In addition, it is possible to suppress the occurrence of the auxiliary equipment battery 22 going dead, in a state in which the electric vehicle 12 has not been used for a prolonged time period while the system stop is continued. Furthermore, since there is no need to adopt a large capacity battery for the auxiliary equipment battery 22 in preparation for a case in which the electric vehicle 12 has not been used for a prolonged time period, the auxiliary equipment battery 22 can be made smaller in scale, and the weight of the electric vehicle 12 can be reduced.

In this manner, since the next supplemental charging start time Ts is adjusted depending on the degree of reduction in the auxiliary equipment battery voltage V, it is possible to avoid carrying out supplemental charging from the drive battery 16 to the auxiliary equipment battery 22 any more than necessary, as well as to improve the electrical power economy of the electric vehicle 12.

Further, the vehicle control ECU 20 updates the correction coefficient k in accordance with the formula (4) and the formula (5) noted above (steps S11, S12). By repeatedly updating the correction coefficient k, it is possible to maintain a state of high capacity of the auxiliary equipment battery 22. Consequently, since the capacity of the auxiliary equipment battery 22 can be set without coming under the influence of dark current (standby current), it is possible to further miniaturize the auxiliary equipment battery 22 and reduce the weight of the auxiliary equipment battery 22.

Further, in the case that the first voltage difference $\Delta V$ is greater than the voltage reduction prospective value V0 (i.e., in the case that the second voltage difference ($\Delta V - V0$) is greater than zero), the vehicle control ECU 20 updates the correction coefficient k to a value that is less than the current correction coefficient k, whereas, in the case that the first voltage difference $\Delta V$ is less than the voltage reduction prospective value V0 (i.e., in the case that the second voltage difference ($\Delta V - V0$) is smaller than zero), the vehicle control ECU 20 updates the correction coefficient k to a value that is greater than the current correction coefficient k.

In this manner, since the size of the correction coefficient k is adjusted depending on the first voltage difference $\Delta V$ indicative of the decrease in the auxiliary equipment battery voltage V due to system stop of the electric vehicle 12, by the vehicle control ECU 20 multiplying the supplemental charging start time VT_table(V) by the correction coefficient k, it is possible to adjust the next supplemental charging start time Ts (step S6).

For example, if the first voltage difference $\Delta V$ is larger, the next supplemental charging start time Ts is set to be shorter, and the next supplemental charging is started earlier. In accordance with this feature, in the case that the auxiliary equipment battery voltage V is low, the capacity of the auxiliary equipment battery 22 can be quickly recovered.

Further, in the case that the auxiliary equipment battery 22 becomes deteriorated, or if batteries of different capacities are mounted in the electric vehicle 12, the auxiliary equipment battery 22 can gradually be brought into an optimal state while the correction coefficient k is sequentially updated.

On the other hand, if the first voltage difference ΔV is smaller, the next supplemental charging start time Ts is set to be longer, and the starting of the next supplemental charging is delayed. Consequently, the number of times that the supplemental charging control device 10 is activated can be minimized, power consumption of the auxiliary equipment battery 22 can be suppressed, and the electrical power economy of the electric vehicle 12 can be further improved.

The present invention is not limited to the embodiment described above, and it is a matter of course that various alternative or additional configurations could be adopted therein without deviating from the scope of the present invention as set forth in the appended claims.

What is claimed is:

1. A supplemental charging control device for an electric vehicle, equipped with a drive battery configured to supply electrical power to a drive source of the electric vehicle, and an auxiliary equipment battery configured to supply electrical power to auxiliary equipment of the electric vehicle, the supplemental charging control device carrying out supplemental charging to the auxiliary equipment battery from the drive battery, the supplemental charging control device for the electric vehicle comprising:
   a supplemental charging start time setting unit configured to set a supplemental charging start time with respect to the auxiliary equipment battery, based on a voltage value of the auxiliary equipment battery, after a system stop of the electric vehicle;
   a correction coefficient calculating unit configured to determine a voltage reduction prospective value indicative of how much the voltage value of the auxiliary equipment battery will be reduced by the system stop, based on the voltage value of the auxiliary equipment battery, and calculate a correction coefficient for correcting a next supplemental charging start time, using the determined voltage reduction prospective value, a voltage value of the auxiliary equipment battery at end of a previous supplemental charging mode, and the voltage value of the auxiliary equipment battery at start of a current supplemental charging mode;
   a supplemental charging unit configured to carry out supplemental charging from the drive battery to the auxiliary equipment battery for a predetermined time upon elapse of the supplemental charging start time; and
   a supplemental charging start time adjusting unit configured to adjust the next supplemental charging start time using the correction coefficient, when the next supplemental charging start time is set by the supplemental charging start time setting unit.

2. The supplemental charging control device for an electric vehicle according to claim 1, wherein the correction coefficient calculating unit:
   determines a first voltage difference between the voltage value of the auxiliary equipment battery at the end of the previous supplemental charging mode, and the voltage value of the auxiliary equipment battery at the start of the current supplemental charging mode;
   determines a second voltage difference between the determined first voltage difference and the voltage reduction prospective value; and
   based on the determined second voltage difference, updates the correction coefficient by adjusting a current correction coefficient.

3. The supplemental charging control device for an electric vehicle according to claim 2, wherein:
   in a case that a decrease in the voltage value of the auxiliary equipment battery due to the system stop is greater than the voltage reduction prospective value, the correction coefficient calculating unit updates the correction coefficient to a value that is less than the current correction coefficient, whereas, in a case that the decrease is less than the voltage reduction prospective value, the correction coefficient calculating unit updates the correction coefficient to a value that is greater than the current correction coefficient; and
   the supplemental charging start time adjusting unit adjusts the next supplemental charging start time by multiplying the next supplemental charging start time by the correction coefficient.

* * * * *